US005547290A

United States Patent [19]

Ouchi et al.

[11] Patent Number: 5,547,290
[45] Date of Patent: Aug. 20, 1996

[54] ROLLING BEARING UNIT WITH ROTATIONAL SPEED SENSOR

[75] Inventors: Hideo Ouchi, Fujisawa; Kenji Takei, Toyoda, both of Japan

[73] Assignee: NSK Ltd., Tokyo, Japan

[21] Appl. No.: 527,247

[22] Filed: Sep. 12, 1995

[30]   Foreign Application Priority Data

Sep. 12, 1994 [JP] Japan .................................... 6-217105
Mar. 10, 1995 [JP] Japan .................................... 7-051157
Mar. 24, 1995 [JP] Japan .................................... 7-065871
Aug. 23, 1995 [JP] Japan .................................... 7-214545

[51] Int. Cl.$^6$ .............................. F16C 33/00; G01P 3/48
[52] U.S. Cl. ...................... 384/448; 324/207.25
[58] Field of Search ...................... 384/448; 324/207.25

[56]   References Cited

U.S. PATENT DOCUMENTS

| | | | |
|---|---|---|---|
| 4,988,220 | 1/1991 | Christiansen et al. | 384/448 |
| 5,129,741 | 7/1992 | Deane | 324/207.25 X |
| 5,148,104 | 9/1992 | Ishikawa | 384/448 X |
| 5,296,805 | 3/1994 | Clark et al. | 324/174 |
| 5,385,411 | 1/1995 | Shirai et al. | 384/448 X |

FOREIGN PATENT DOCUMENTS

| | | |
|---|---|---|
| 4-110602 | 9/1992 | Japan . |
| 5-10010 | 2/1993 | Japan . |
| 5-14634 | 2/1993 | Japan . |
| 5-27335 | 4/1993 | Japan . |
| 7-31539 | 6/1995 | Japan . |

*Primary Examiner*—Thomas R. Hannon
*Attorney, Agent, or Firm*—Evenson, McKeown, Edwards & Lenahan

[57]   ABSTRACT

A rolling bearing unit comprises outer and inner ring members, a cover having an open and portion fitted to the outer ring member and a rotational speed sensor which is mounted in the cover to detect the rotation of the inner ring member, such that the cover can be removed from the outer ring member without causing any damage on the associated components, by applying a tool to the open end portion of the cover at a recess on the outer ring member faced to the open end portion of the cover.

7 Claims, 9 Drawing Sheets

ROLLING BEARING UNIT WITH ROTATIONAL SPEED SENSOR

BACKGROUND OF THE INVENTION

1. Field of the Invention

The present invention relates to a rolling bearing unit with a rotational speed sensor (referred to hereunder as a speed sensing rolling bearing unit), used for rotatably supporting a vehicle wheel on a suspension unit, and detecting the rotational speed of the wheel.

2. Description of the Related Art

There are known speed sensing rolling bearing units such as disclosed in Japanese Patent First Publication KOKAI No. S63-166601, for rotatably supporting a vehicle wheel on a suspension unit, and detecting the rotational speed of the wheel to enable control of an anti-lock braking system (ABS) or a traction control system (TCS).

Figure 8:
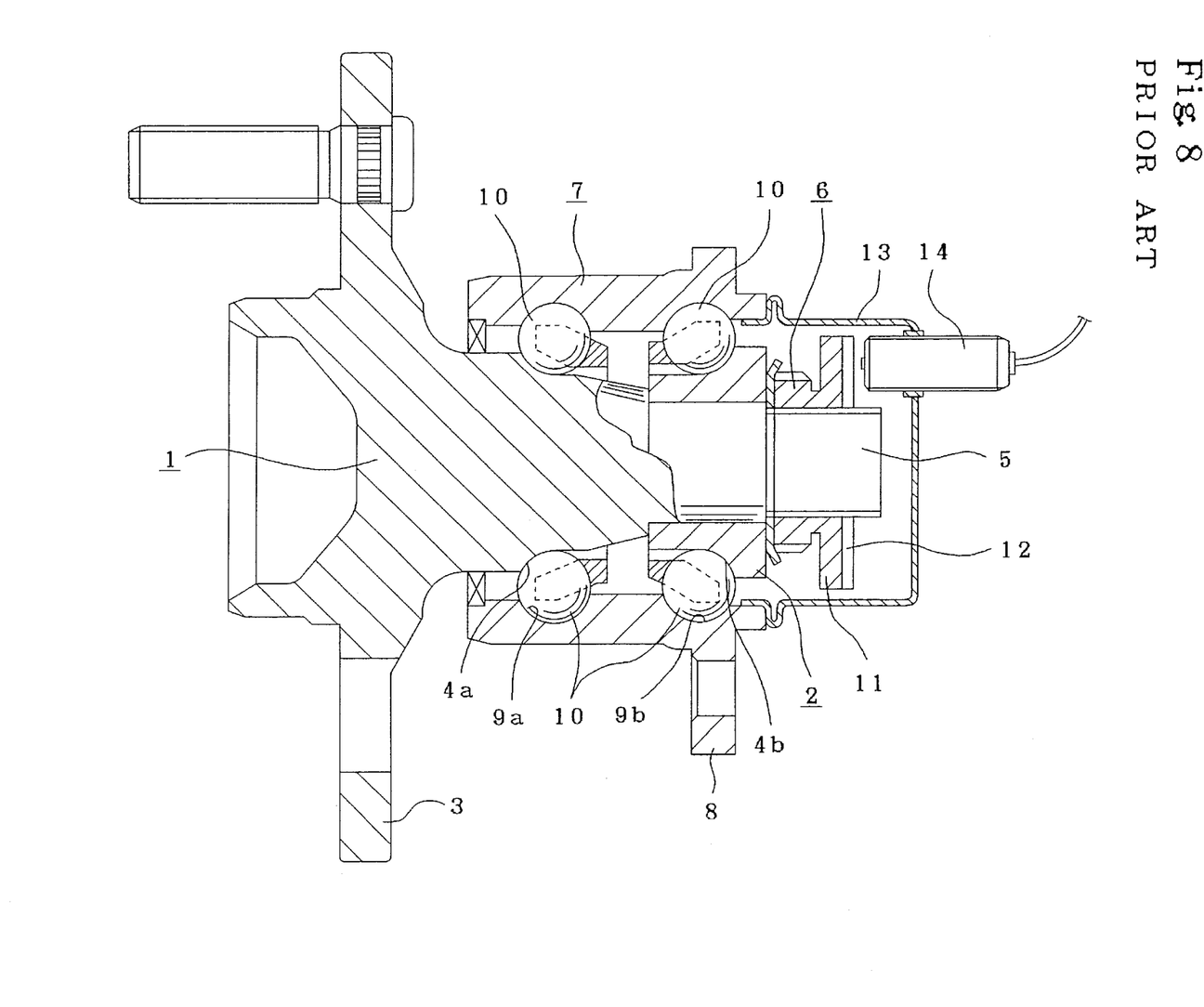
FIG. 8 is a cross-sectional view of part of a rolling bearing unit showing a first example of a conventional construction.

FIG. 8 shows the speed sensing rolling bearing unit disclosed in the abovementioned publication. An inner ring member comprises a hub 1 and an inner ring 2. A flange 3 for wheel fixture, is provided on an axially outer end portion of the hub 1 (here and throughout the specification, "axially outer end or side" means the outer end or side in a widthwise direction when fitted to a vehicle; the lefthand side in the figures), and an inner ring raceway 4a is formed on an outer peripheral surface at an central portion thereof. The inner ring 2 has an inner ring raceway 4b on an outer peripheral face thereof, and is externally fitted to the outer peripheral surface at the central portion of the hub 1.

A nut 6 is threaded onto a threaded portion 5 formed on an outer peripheral face of the axially inner end portion of the hub 1 (here "axially inner end or side" means the end or side towards the center in a widthwise direction when fitted to a vehicle; the right hand side in the figures). The nut 6 is tightened onto the threaded portion 5 to press against the axially inner end face of the inner ring 2 and thereby secure the inner ring 2 at a predetermined location on the outer peripheral face of the hub 1.

An outer ring member 7 is formed with an outwardly flanged attachment portion 8 for attachment to a suspension unit (not shown), on an outer peripheral face thereof, and a double row outer ring raceway 9a, 9b on an inner peripheral face thereof.

A plurality of rolling bodies 10 are provided between the outer ring raceway 9a, 9b and the inner ring raceways 4a, 4b, so that the hub 1 is rotatably supported inside the outer ring member 7, which is supported on the suspension unit by means of the attachment portion 8.

The rolling bodies 10 are in the form of balls in FIG. 8, but when the bearing unit is for heavy vehicle use, tapered rollers may be used, instead of balls, for the rolling bodies 10.

A ring shaped rotor 11 is provided on the nut 6 and formed with recess/protrusions 12 on the axially inner end face thereof. By means of the recess/protrusions 12, the nut 6 causes a pulsed output to be generated in a sensor 14 (described hereunder) with rotation of the hub 1, and thus functions as a tone wheel.

The sensor 14 is fixed to a cover 13 which is engagingly secured inside an opening at the axially inner end of the outer ring member 7, so that an axially outer end face of the sensor 14 is opposed to the recess/protrusions 12.

With the speed sensing rolling bearing unit as described above, a vehicle wheel fixed to the flange 3 on the axially outer end portion of the hub 1 can be rotatably supported relative to a suspension unit attached to the outer ring member 7. When the rotor 11 formed integrally with the nut 6 which is threaded onto the axially inner end portion of the hub 1, rotates with rotation of the vehicle wheel, the output of the sensor 14 faced to the recess/protrusions 12 on the axially inner end face of the rotor 11 changes.

Since the frequency with which the output of the sensor 14 changes is proportional to the rotational speed of the vehicle wheel, then if the output signal of the sensor 14 is input to a controller (not shown), the rotational speed of the vehicle wheel can be obtained, so that an anti-lock braking system (ABS) or a traction control system (TCS) can be appropriately controlled.

With the conventional speed sensing rolling bearing unit constructed and operated as described above, the cover 13 supports the sensor 14 relative to the outer ring member 7, and the axially outer end portion of the sensor 13 is tightly engaged with the opening at the axially inner end of the outer ring member 7. This is to prevent the cover 13 inadvertently coming off from the outer ring member 7 due to vibrations occurring for example when the vehicle is traveling.

Due to this tight engagement of the outer ring member 7 and the cover 13, separation of the outer ring member 7 and the cover 13 is difficult. Moreover, if the cover 13 is forcefully prized apart from the outer ring member 13 using a tool such as a screwdriver, the cover 13 may be deformed so that it cannot be reused.

Therefore, after the speed sensing rolling bearing unit is installed in the vehicle, for example with use over an extended period, if an abnormality such as a fault occurs in one or other of the rolling bearing portion and the sensor 14, then the whole of the speed sensing rolling bearing unit must be changed including the non faulty part. Not only does this increase the repair cost, but it is also undesirable from the point of view of conservation of resources.

Figure 9:
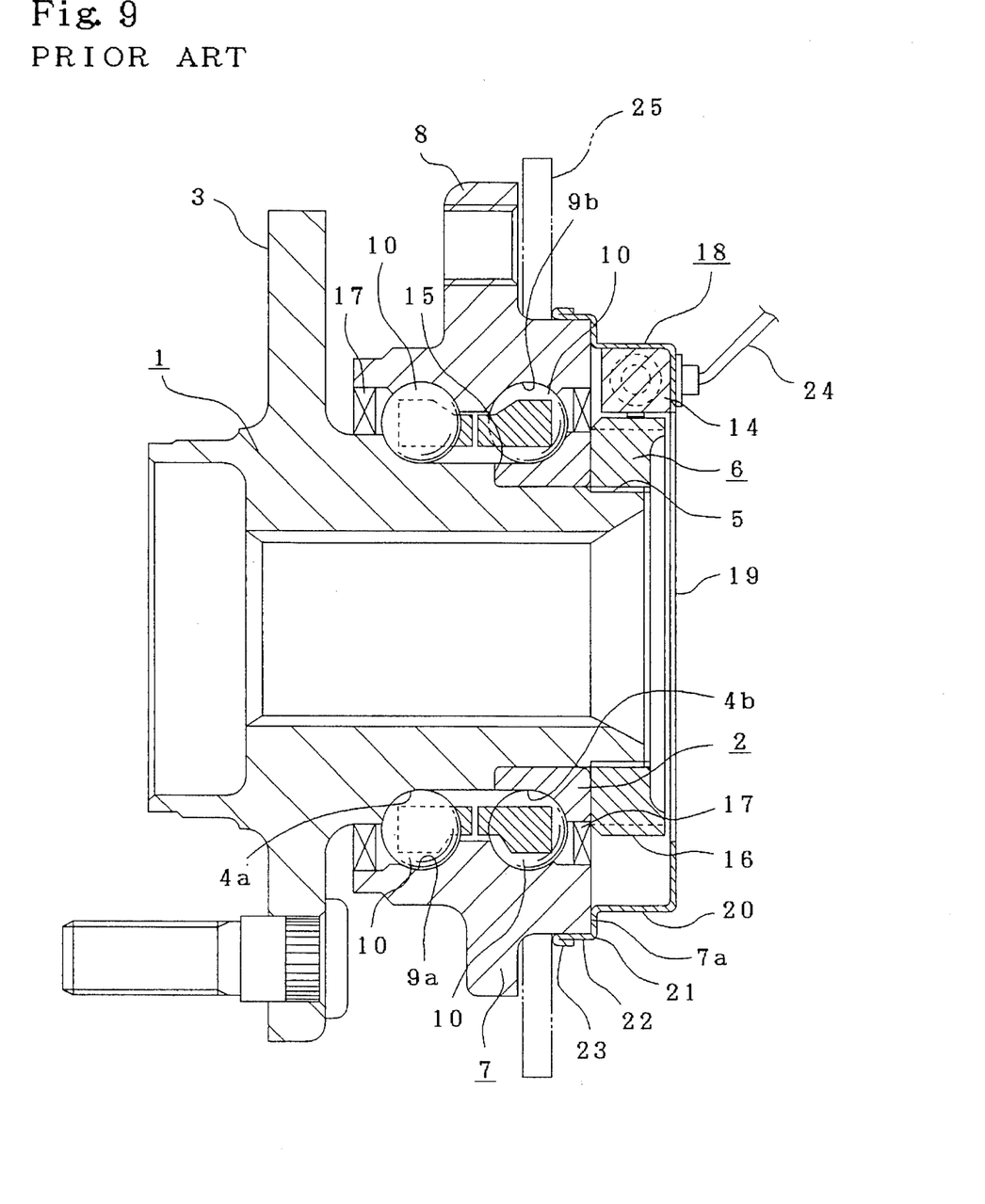
FIG. 9 is a cross-sectional view of part of a rolling bearing unit showing a second example of a conventional construction.

Japanese Utility Model First Publication KOKAI No. H5-14634 discloses a speed sensing rolling bearing unit as shown in FIG. 9 which takes the above into consideration. With this unit, an inner ring member comprises a hub 1 and an inner ring 2. The hub 1 has an outer peripheral face on its axially outer end which is formed with a flange portion 3 for wheel fixture, and a central outer peripheral face which is formed with an inner ring raceway 4a and step portion 15. The inner ring 2 is similarly formed with an inner ring raceway 4b on an outer peripheral face thereof, and is fitted to the outer peripheral face of the hub 1 with its axially outer end face (left end face in FIG. 9) abutted against the step portion 15.

A threaded portion 5 is formed on an outer peripheral face of the hub 1 at its axially inner end portion. A nut 6 is threaded onto the threaded portion 5 and tightened to thereby secure the inner ring 2 at a predetermined location on the outer peripheral face of the hub 1. Recesses/protrusions 16 are formed on the outer peripheral face of the nut 6, so that the nut 6 functions as a tone wheel for detecting rotational speed.

An attachment portion 8 for attaching the outer ring member 7 to a suspension unit (not shown), is provided on the outer peripheral face of the outer ring member 7.

Moreover, outer ring raceways 9a, 9b are formed on an inner peripheral face of the outer ring member 7 so as to be faced to the respective inner ring raceways 4a, 4b.

A plurality of rolling bodies, specifically balls, 10 are provided between the pair of inner ring raceways 4a, 4b and the pair of outer ring raceways 9a, 9b, respectively, so that the hub 1 is rotatably supported inside the outer ring member 7. There is a space for accommodating the plurality of balls 10, which exists between the inner peripheral face of the outer ring member 7 and the outer peripheral faces of the hub 1 and the inner ring 2. Seals 17 is fitted between the inner peripheral face on the axially outer end portion of the outer ring member 7 and the outer peripheral face of the hub 1 and between the inner peripheral face on the axially inner end portion of the outer ring member 7 and the inner ring 2, respectively, to cover the axially inner and outer end openings of the space.

The opening at the axially inner end of the outer ring member 7 (right end in FIG. 9) is covered with a cover 18. The cover 18 is formed in an overall annular shape by press forming a metal plate, and has a base plate 19 formed in a ring shape and a cylindrical wall portion 20 formed by bending an outer peripheral rim portion of the base plate 19 at right angles axially outwards (to the left in FIG. 9). Accordingly, a part of a constant velocity joint can be inserted inside the cover 18. Moreover, a ring shaped step portion 21 is formed on an outer peripheral rim around an axially outer end opening (left end in FIG. 9) of the wall portion 20, which abuts against an axially inner end face 7a of the outer ring member 7.

The outer peripheral rim of the step portion 21 is bent perpendicularly and axially outwards to form an engaging cylindrical portion 22 which is engaged snugly over the axially inner end of the outer ring member 7. Moreover, the opening portion at the axially outer end of the engaging cylindrical portion 22 is bent radially outwards and then folded back through 180 degrees to form an engagement portion 23 with a larger radial thickness. The cover 18 is fixed relative to the outer ring member 7 by externally fitting the engaging cylindrical portion 22 onto the axially inner end portion of the outer ring member 7, with the step portion 21 abutted against the axially inner end face 7a of the outer ring member 7. The engagement strength between the engaging cylindrical portion 22 and the axially inner end of the outer ring member 7 is sufficiently strong to prevent separation of the cover 18 from the outer ring member 7, due for example to vibration accompanying vehicle running.

A sensor 14 such as an electromagnetic type sensor is retained inside the cover 18, and the output from the sensor 14 is sent to a controller (not shown in the figure) by way of a lead 24.

With the rotational speed sensing bearing unit constructed as described above, the operation when rotatably supporting the vehicle wheel relative to the suspension unit, and detecting the rotational speed of the vehicle wheel fixed to the flange 3 of the hub 1, is practically the same as for the speed sensing rolling bearing unit shown in FIG. 8.

With the construction shown in FIG. 9 however, when it is necessary to separate the cover 18 from the outer ring member 7, for example for repair work, then as shown by the chain line in FIG. 9, a tool 25 such as a hand press or a pulley puller is used. The tool 25 has an engaging portion of a split type, and an inner peripheral rim of the engaging portion of the tool 25 is engaged with the end rim of the engagement portion 23 formed on the axially outer peripheral rim around the axially outer end opening of the cover 18. The cover 18 can thus be drawn away from the outer ring member 7 by moving the tool 25 away from the attachment portion 8 in the direction of separation (to the right in FIG. 9), thus removing the cover 18 from the outer ring member 7.

With the conventional construction as shown in FIG. 9, the following points (1) and (2) still remain to be solved.

(1) The height of the engagement portion 23 cannot be sufficiently ensured, and hence engagement between the inner peripheral rim of the tool 25 and the engagement portion 23 is inadequate.

(2) The space between the end rim of the engagement portion 23 which engages with the inner peripheral rim of the tool 25, and the inner end face of the attachment portion 8 on the outer ring member 7 is narrow, so that the thickness of the tool 25 cannot be adequately ensured.

The above first point (1) will now be discussed. Since the engagement portion 23 is formed by bending a portion around the axially outer end opening of the engaging cylindrical portion 22 radially outwards and then folding back through 180 degrees, the radial thickness of the engagement portion 23 is only two times the thickness of the metal plate of the cover 18. Therefore since the plate thickness is around 0.8 mm, then the radial thickness of the engagement portion 23 is only around 1.6 mm. Hence the overlap between the engagement portion 23 and the inner peripheral rim of the tool 25 cannot be sufficiently ensured, with the result that the inner peripheral rim of the tool 25 is easily damaged by crushing during withdrawal, so that the withdrawal operation cannot be reliably carried out.

The above second point (2) will now be discussed. The location of the end rim of the engagement portion 23 to be engaged with the inner peripheral rim of the tool 25, is made to coincide with the location of the opening rim at the axially outer end of the cover 18. Moreover, since the engagement length is made large to ensure adequate engagement strength between the engaging cylindrical portion 22 and the outer ring member 7, it is necessary for the location of the opening rim at the axially outer end to be a reasonable distance from the axially inner end face 7a of the outer ring member 7. As a result, the distance between the opening rim of the engagement portion 23 and the axially inner side face of the attachment portion 8 is reduced, so that the thickness of the engaging portion of the tool 25 must be made small to fit between the opening rim of the engagement portion 23 and the axially inner side face of the attachment portion 8. Accordingly, the configuration of the speed sensing rolling bearing unit may cause problems with ensuring the rigidity of the tool 25, and the cover 18 removal operation is difficult.

SUMMARY OF THE INVENTION

An object of the present invention is to provide a speed sensing rolling bearing unit which addresses the above problems (1) and (2) and the like.

Another object of the present invention is to provide a speed sensing rolling bearing unit in which removal of the cover from the outer ring member for repair and the like is facilitated.

The speed sensing rolling bearing unit of the present invention comprises outer and inner ring members and a cover fitted to the outer ring member and having a sensor mounted in it, and a portion of the outer ring member and a portion of the cover jointly form an engagement section to be hooked by a tool to remove the cover from the outer ring member.

DESCRIPTION OF THE PREFERRED EMBODIMENTS

The speed sensing rolling bearing unit according to the present invention, as with the beforementioned conventional speed sensing rolling bearing unit, comprises an outer ring member which does not rotate during use and has an outwardly flanged attachment portion on an outer peripheral face thereof and an outer ring raceway on an inner peripheral face thereof, an inner ring member which rotates during use and has an inner ring raceway and a flange for wheel fixture on an outer peripheral face thereof, a plurality of rolling bodies provided between the outer ring raceway and inner ring raceway, a tone wheel fixed to the inner ring member, a cover fixedly engaged with an end opening portion of the outer ring member, and a sensor supported in the cover so as to be faced to the tone wheel.

With the speed sensing rolling bearing unit according to the present invention an outwardly flanged brim is formed on an outer peripheral face of the cover, and at least a portion of this brim around the periphery of the cover protrudes radially outwards from the outer peripheral face of the axially inner end portion of the outer ring member which is faced to this portion of the cover. Or, at least a portion of the outer peripheral face of the axially inner end portion of the outer ring member is recessed from the brim of the cover at the circumferential location of the portion.

The cover therefore has for example a ring shaped step portion which is formed on an outer peripheral rim of an axially outer end opening portion so as to be abutted with the axially inner end face of the outer ring member, an engaging cylindrical portion which is formed by bending the outer peripheral rim of the step portion perpendicularly and axially outwards so as to be engaged with the axially inner end portion of the outer ring member, and an outwardly flanged brim which is formed on the outer peripheral face of the engaging cylindrical portion by expanding a portion of the metal plate of the cover radially outwards while pressing axially to thereby produce an upset.

Alternatively, an outwardly flanged brim is formed on an outer peripheral face of the cover such that one side face of the brim is abutted against one end face of the outer ring member.

Moreover, the outer diameter of the brim is made less than the outer diameter of the cylindrical face portion of the outer ring member between the end opening and the attachment portion. It should be noted that this cylindrical face portion is formed so as to attach the outer ring member to the suspension unit.

Accordingly, at the time of engagingly fixing the cylindrical face portion of the outer ring member to the suspension unit, the brim of the cover does not interfere with the peripheral rim of the aperture in the suspension unit.

Furthermore, recesses are formed on the cylindrical face portion of the outer ring member to open to the end face of the outer ring member, and have a bottom face located radially inwards further than the outer peripheral rim of the brim.

With the speed sensing rolling bearing unit according to the present invention, the operation when rotatably supporting a vehicle wheel relative to the suspension unit, and detecting the rotational speed of the vehicle wheel, is the same as for the beforementioned conventional speed sensing rolling bearing unit.

In the case of the speed sensing rolling bearing unit according to the present invention, the cover supporting the sensor can be easily removed from the outer ring member, by engaging a tool with the brim portion of the cover.

The brim portion of the cover can be formed with a sufficient height which is not directly influenced by the thickness of the metal plate of the cover. Accordingly, the overlap of the tool and the brim portion can be sufficiently maintained so that the cover removal operation can be reliably carried out, without damage to the tool.

Moreover, if the outer diameter of the brim portion of the cover is made equal to or less than the outer diameter of the cylindrical face of the outer ring member, then at the time of fitting the speed sensing rolling bearing unit to the suspension unit, the cover does not cause any obstruction. That is to say, when fitting the speed sensing rolling bearing unit to the suspension unit, the cylindrical face portion formed between the attachment portion and the end opening of the outer ring member, is inserted into the aperture formed in a structural component of the suspension unit (for example the knuckle), and the structural component then bolted to the attachment portion of the outer ring member. During the insertion operation, since the brim portion can pass inside the inner peripheral face of the aperture, the operation of attaching the speed sensing rolling bearing unit to the suspension unit can be carried out with the cover fitted to the outer ring member.

Figure 1:
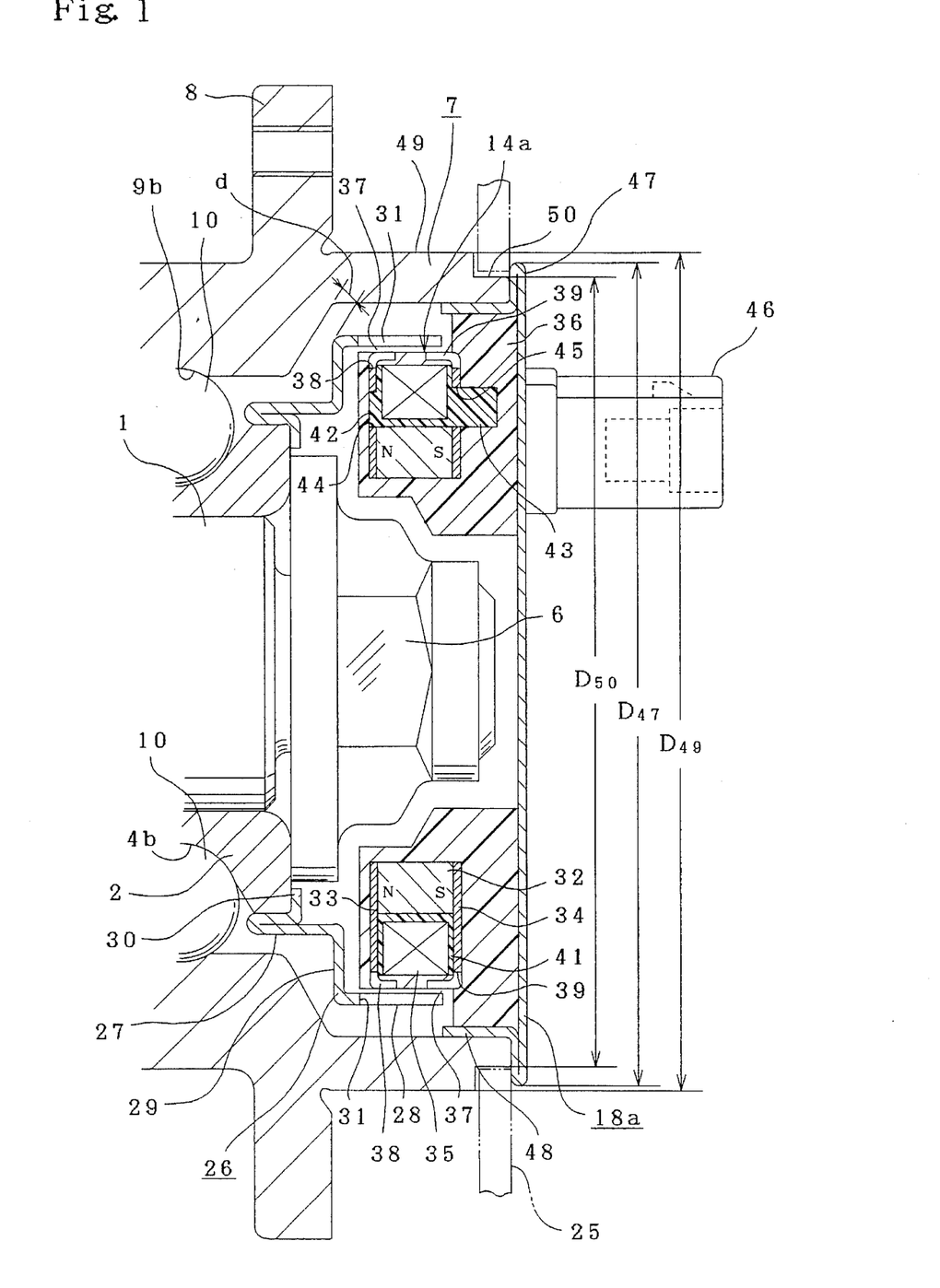
FIG. 1 is a cross-sectional view of part of a rolling bearing unit, showing an embodiment of the present invention.

Now, FIG. 1 shows a first embodiment of the present invention.

With the embodiment shown in the FIG. 1, the construction of the rotational speed detection unit including the sensor 14a is made different to that of the conventional sensors so as to increase output of the sensor 14a and to improve the accuracy in detecting the rotational speed of the vehicle wheel. Therefore with the following description, as well as giving a detailed description of the cover 18a which supports the sensor 14a, a description is also given of the rotational speed detection unit components.

However, since the basic configuration of the rolling bearing unit part, comprising an outer ring member 7 and an inner ring member comprising a hub 1 and an inner ring 2 rotatably supported inside the outer ring member 7, is substantially the same as the conventional configurations shown in FIGS. 8 and 9, then the figures and description of the parts duplicated in the conventional configuration are either omitted or abbreviated.

The rotational speed detection unit of the present invention comprises a tone wheel 26 and a sensor 14a. The tone wheel 26 is formed in a generally cylindrical shape from a magnetic metal plate such as steel plate, and comprises a smaller diameter portion 27 and a larger diameter portion 28. The axially inner end rim (right end rim in FIG. 1) of the smaller diameter portion 27 is connected to the axially outer end rim (left end rim in FIG. 1) of the larger diameter portion 28 by a step portion 29 giving a crank shape in cross section.

One portion of the magnetic metal plate is folded back through 180 degrees at the axially outer end rim portion on the smaller diameter portion 27, and the tip portion of the one portion then bent radially inwards through 90 degrees, to thus give an inwardly flanged brim 30. The tone wheel 26 is secured to the inner ring 2 by press fitting the smaller diameter portion 27 onto the axially inner end portion (right end portion in FIG. 1) of the inner ring 2, by pressing the brim 30 with a tool or the like.

With the tone wheel 26 fixed to the inner ring 2 in this manner, the larger diameter portion 28 is located around the periphery of the nut 6 which clamps the inner ring 2.

The dimension d of a gap between a corner portion connecting the larger diameter portion 28 and the step portion 29, and a tapered, inner peripheral face on an axially inner end portion of the outer ring member 7 is made extremely small, for example no more than 1 mm (d<1 mm), so that this portion acts as a labyrinth seal. As a result, lubricant such as grease for lubricating the rolling bearing unit parts is prevented from flowing into the mounting region of sensor 14a. Accordingly, when the sensor 14a is removed, a reduction in lubricant due to outflow with the sensor 14a does not occur. Accordingly, there is no need of pouring new grease every time when exchanging the sensor, so that the sensor is easily exchanged. Although the labyrinth seal structure is formed in this embodiment, a contact seal structure 6an be adopted so as to positively prevent the grease loss upon the sensor exchange.

Cut-outs 31 are formed in the larger diameter portion 28 at even spacing around the circumference, with tongue portions of magnetic material between pairs of circumferentially adjacent cut-outs 31. The larger diameter portion 28 is thus formed with comb like teeth.

The sensor 14a comprises a permanent magnet 32, first and second stators 33, 34 formed from a magnetic metal plate with an L-shape in cross section, and a coil 35. The permanent magnet 32, first and second stators 33, 34 and coil 35 are respectively formed in an annular shape and embedded in a synthetic resin 36.

The permanent magnet 32 is magnetized in the axial direction (left/right direction in FIG. 1) around the whole periphery, with the magnetized direction unchanged therearound.

The axially inner face (right face in FIG. 1) of a radially inner, base end portion of the first stator 33 is abutted against the axially outer end face (left end face in FIG. 1) of the permanent magnet 32, while an outer peripheral face of a radially outer, tip end portion of the first stator 33 is faced to a central portion on the inner peripheral face of the larger diameter portion 28, across a small gap 37.

Moreover the axially outer face (left face in FIG. 1) of a radially inner, base end portion of the second stator 34 is abutted against the axially inner end face (right end face in FIG. 1) of the permanent magnet 32, while an outer peripheral face of a radially outer, tip end portion of the second stator 34 is faced to the inner peripheral face of the tip end portion (right end in FIG. 1) of the larger diameter portion 28, also across the small gap 37.

The radially outer, tip end portions of the first and second stators 33, 34 are formed with cut-outs 38, 39, in a comb like teeth shape respectively. The pitch (central angle pitch) of the cut-outs 31 formed in the larger diameter portion 28 of the tone wheel 26 is made the same as that of the respective cut-outs 38, 39. Moreover, the phases of the cut-outs 38, 39 formed in the first and second stators 33, 34 are made the same.

A coil 35 is provided in the region surrounded by the outer peripheral face of the permanent magnet 32, and the respective side faces of the first and second stators 33, 34.

A voltage which changes with a frequency proportional to the rotational speed of the tone wheel 26 is produced in the coil 35 depending on the change in the density of the magnetic flux flowing in the permanent magnet 32, first stator 33 and second stator 34.

The coil 35 is made by winding a wire around a synthetic resin bobbin 41 having a C-shape in cross section and open on the outer peripheral side. At least one protuberance 42 is formed on the axially outer face (left face in FIG. 1) of the bobbin 41 while at least one protuberance 43 is formed on the axially inner face (right face in FIG. 1) of the bobbin 41. The protuberances 42, 43 are inserted into through holes 44, 45 formed in the first and second stators 33, 34, respectively. The protuberances 42, 43 are engaged with the through holes 44, 45, respectively, to thereby make the phases of the cut-outs 38, 39 coincide.

An end of the wire of the coil 35 is taken by way of the protuberance 43 formed on the axially inner face (right face in FIG. 1) of the bobbin 41, and connected to a terminal of a connector 46 fixed to an axially inner face (right face in FIG. 1) of a cover 18a, to be described hereunder.

One part of the outer ring member 7 of the rolling bearing unit extends as far as the region around the nut 6 further towards the end opening than the attachment portion 8 fixedly provided on the outer peripheral face of the outer ring member 7 (towards the inner end opening, that is, towards the right end opening in FIG. 1). The outer peripheral face of the extended portion forms a cylindrical outside face 49.

In fixedly attaching the outer ring member 7 to a knuckle (not shown) which is a member constituting the suspension unit, the cylindrical face 49 is inserted snugly into the aperture formed in the knuckle, and the attachment portion 8 secured to the knuckle by means of bolts (not shown in FIG. 1).

The cylindrical outside face 49, that is outer peripheral face of the axially inner end portion of the outer ring member 7 is formed with a step-shaped recess 50 around the whole circumference. In other words, the axially inner end of the outer ring member 7 is made smaller in diameter to form an annular recess 50.

The axially inner end opening of the outer ring member 7 (the right end opening in FIG. 1) is covered by the cover 18a. The cover 18a is made of a metal plate such as a stainless steel plate in an overall disk shape by a plastic forming process, for example pressing or drawing.

More specifically, a radially outer peripheral portion of an annular metal plate blank is folded back radially inwards through 180 degrees to thereby form an outwardly flanged brim 47 on the outer peripheral portion of the cover 18a.

The outer diameter $D_{47}$ of the brim 47 of the cover 18a is made equal to or less than the outer diameter $D_{49}$ of the cylindrical face 49 of the outer ring member 7, and greater than the diameter $D_{50}$ of the bottom face of the annular recess 50 ($D_{49} \geq D_{47} > D_{50}$).

A radially intermediate portion of the portion folded back through 180 degrees is then bent through 90 degrees axially outwards to thereby form an engaging cylindrical portion 48.

With the speed sensing rolling bearing unit of the present invention constructed as described above, the cover 18a which supports the sensor 14a can be easily removed from the outer ring member 7, by inserting a tool 25 into the recess 50, so that the tool 25 is engaged with the brim 47.

Since the dimension of the brim 47 is not directly influenced by the thickness of the metal plate of the cover 18a, it can be formed with a height much greater than that thickness. Consequently the overlap of the tool 25 and the brim 47 can be sufficiently ensured, so that the operation of removing the cover 18a can be reliably carried out without damaging the tool.

Since the outer diameter $D_{47}$ of the brim 47 is equal to or less than the outer diameter $D_{49}$ of the cylindrical face 49, then when inserting the cylindrical face 49 into the knuckle aperture in order to fit the speed sensing rolling bearing unit to the suspension unit, the cover 18a does not cause an obstruction. That is to say, when the cylindrical face 49 formed between the attachment portion 8 and the axially inner end opening of the outer ring member 7, is inserted into the aperture formed in the knuckle which is a structural component of the suspension unit, in order to attach the speed sensing rolling bearing unit to the suspension unit, the brim 47 smoothly passes inside the inner peripheral face of the aperture.

The operation of attaching the speed sensing rolling bearing unit to the suspension unit can thus be carried out with the cover 18a fitted inside the portion near the axially inner end opening of the outer ring member 7. Moreover since the axial length (in the left/right direction in FIG. 1) of the cylindrical face 49 can be sufficiently ensured, the outer ring member 7 can be supported relative to the knuckle with the cylindrical face 49 inserted into the aperture of the knuckle with a minimum play, maintaining a sufficiently large bending rigidity.

Moreover, with the embodiment shown in FIG. 1, the sensor 14a is formed in an annular shape, and the peripheral speed of the larger diameter portion 28 of the tone wheel 26 faced to the outer peripheral face of the sensor 14a can be increased, thus enabling an increase in output of the sensor 14a.

Furthermore, since the sensor 14a is located radially inside the tone wheel 26, then the diameter of the coil 35 of the sensor 14a does not need to be large. The overall length of the wire of the coil 35 can thus be shorter minimizing the output drop due to resistance of the wire.

Furthermore, with the construction shown in FIG. 1, the magnetic reluctance accompanying rotation of the tone wheel 26 changes simultaneously at two locations, namely between the outer peripheral face of the first stator 33 and the inner peripheral face of the larger diameter portion 28, and between the outer peripheral face of the second stator 34 and the inner peripheral face of the larger diameter portion 28. As a result, the change in magnetic reluctance with rotation of the tone wheel 26 is increased, giving an increase in the change in density of the magnetic flux flowing in the magnetic circuit, thus enabling an even further increase in the output of the sensor 14a.

The feature of the present invention as mentioned above is that the operation of removing the cover 18a from the outer ring member 7 can be easily carried out without damage to the tool 25, the outer ring member 7 or the cover 18a. Accordingly, there are no particular limitations to the structure of the sensor 14a due to the present embodiment.

That is to say the sensor is not limited to the so-called passive type rotational speed detection unit as shown in FIG. 1, wherein the voltage induced in the coil 35 changes in accordance with the change in density of the magnetic flux passing through the first and second stators 33, 34, and a so-called active type rotational speed detection unit may also be used.

When an active type rotational speed detection unit is used, permanent magnets with the polarity changing alternately around the circumferential direction are used for the tone wheel, and magnetic detection elements such as Hall ICs are fitted to the sensor.

Furthermore, an optical type rotational speed detection unit may be constructed with a tone wheel fixed to the inner ring member and having optical characteristic changing alternately and at even spacing around the peripheral direction, and with photo sensors fixed to the cover 18.

Figure 2:
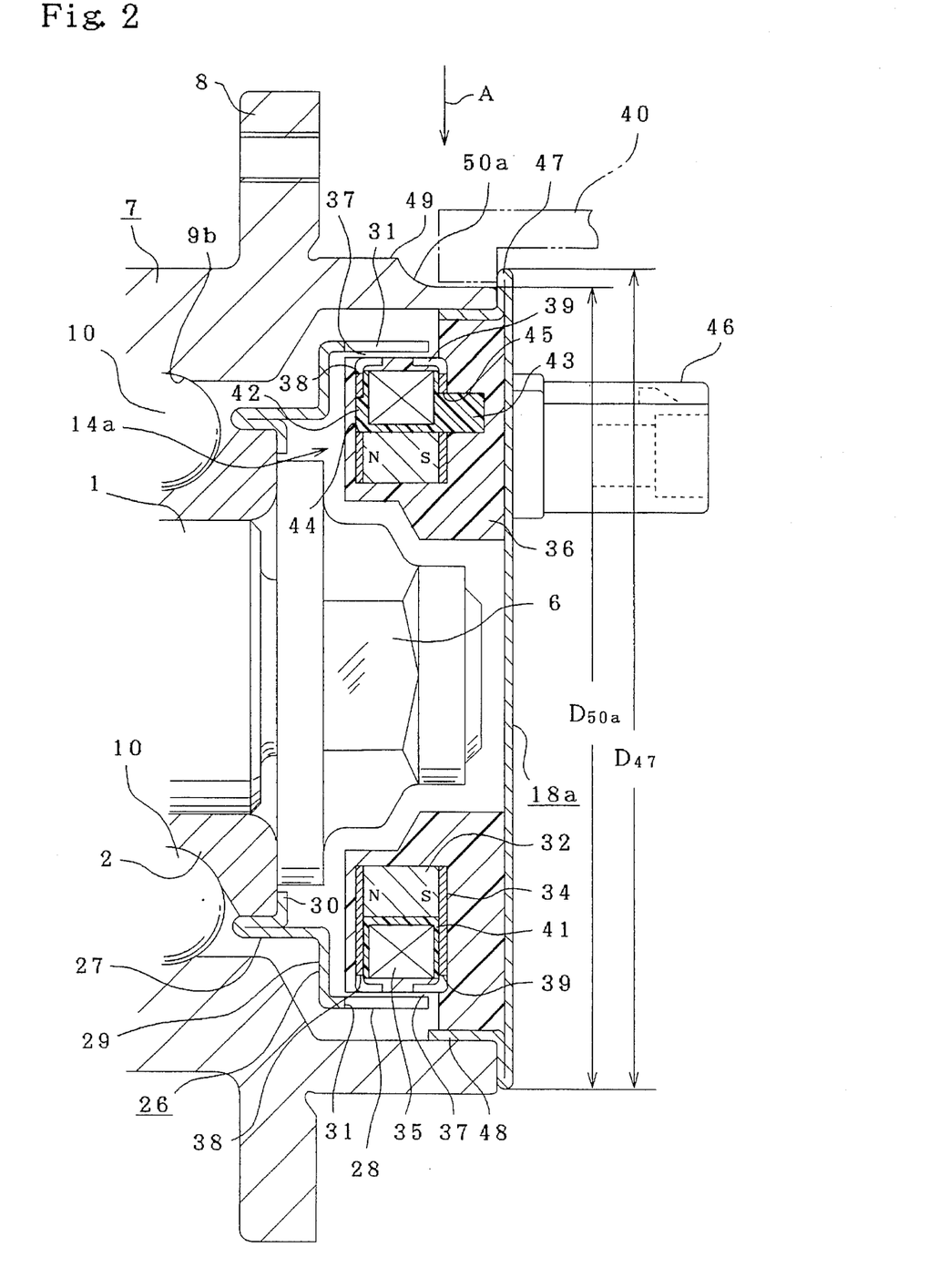
FIG. 2 is a cross-sectional view of part of a rolling bearing unit, showing a second embodiment of the present invention.
Figure 3:
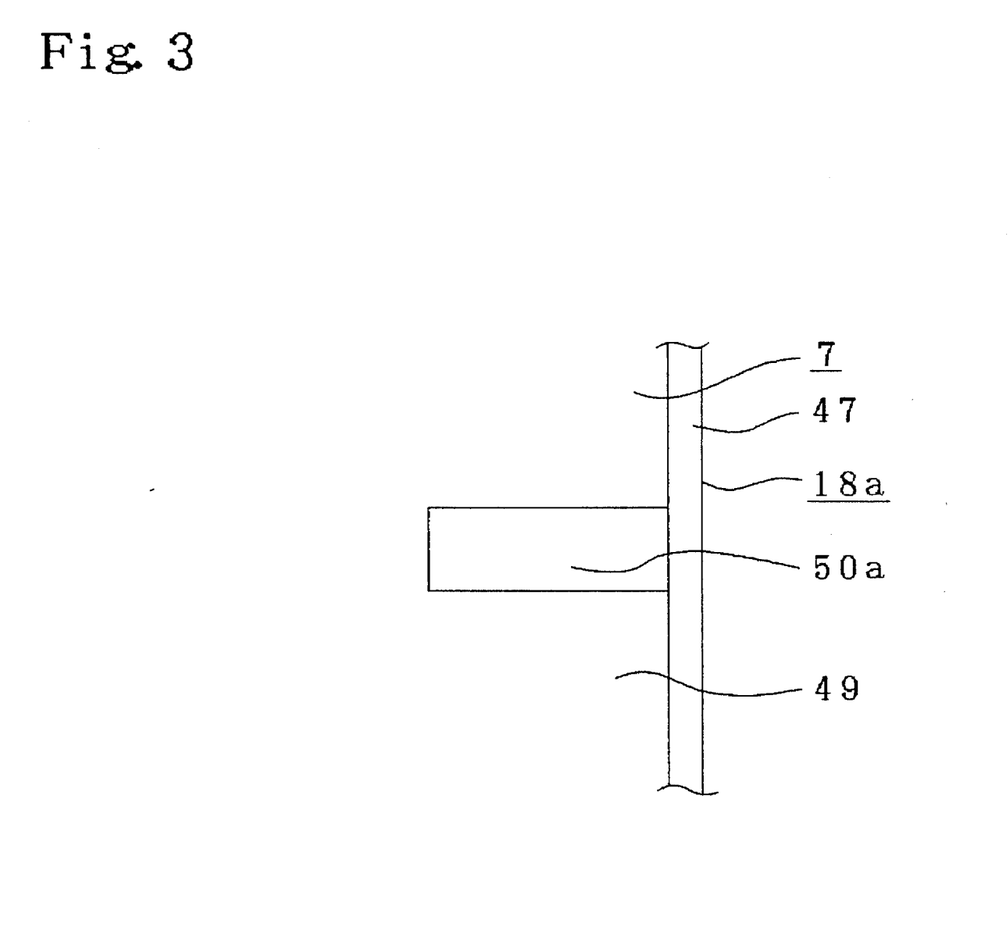
FIG. 3 is a view in the direction of arrow A of FIG. 2.

FIGS. 2 and 3 show a second embodiment according to the present invention. With the second embodiment, recesses 50a are formed at a plurality of locations (for example 3 or 4 locations) around the periphery of the cylindrical face 49 of the outer ring member 7, and open to the axially inner end face (right end face in FIG. 2) of the outer ring member 7.

The diameter $D_{50a}$ of a maximum inscribed circle connecting bottom faces of the plurality of recesses 50a is made smaller than the diameter $D_{47}$ of the brim 47 formed on the cover 18a ($D_{50a}<D_{47}$). With the second embodiment, in removing the cover 18a from the outer ring member 7, hook shaped tips of a tool 40 are inserted into the recesses 50a, so that the tips of the tool 40 are engaged with the brim 47.

In the case of this embodiment, since the recesses 50a are not formed around the whole circumference, then the axial length of the cylindrical face 49 can be ensured even more than for the case of the first embodiment. Therefore, the outer ring member 7 can be supported relative to the knuckle (not shown) with the cylindrical face 49 inserted into the aperture of the knuckle with a minimum play, maintaining an even greater bending rigidity. Other details of the construction and operation are the same as for the abovementioned first embodiment.

Figure 4:
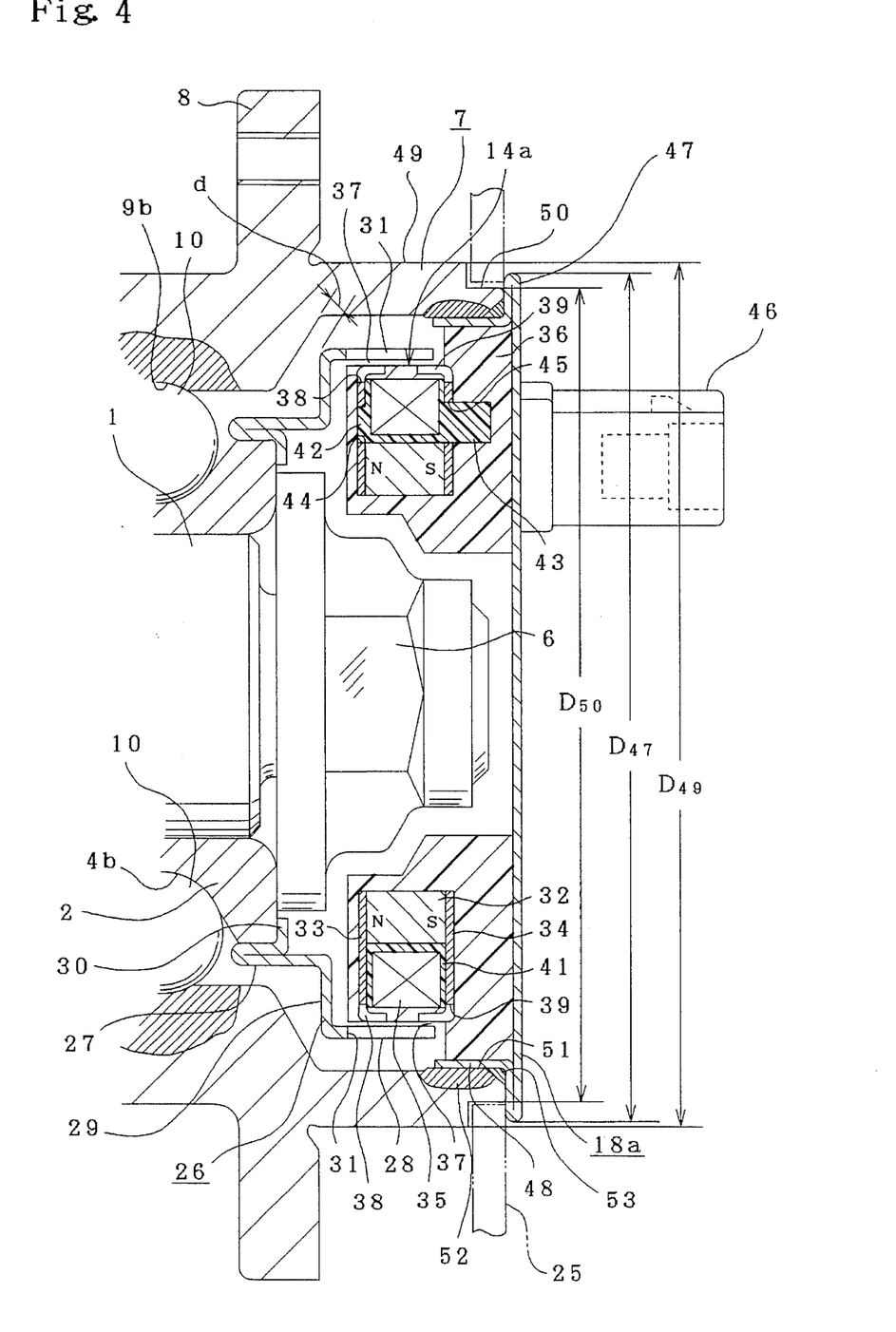
FIG. 4 is a cross-sectional view of part of a rolling bearing unit, showing a third embodiment of the present invention.
Figure 5:
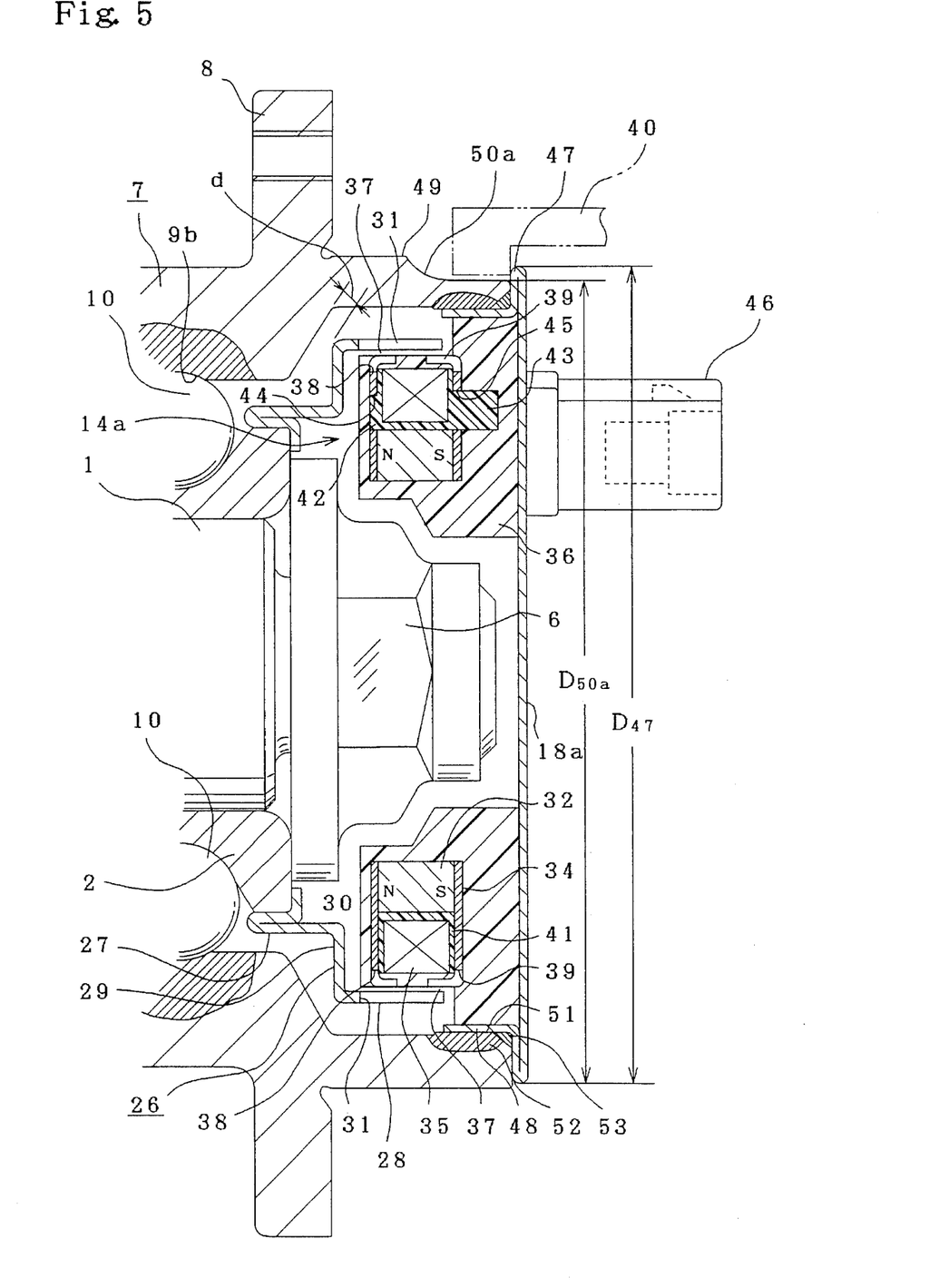
FIG. 5 is a cross-sectional view of part of a rolling bearing unit, showing a fourth embodiment of the present invention.

FIGS. 4 and 5 show respective third and fourth embodiments according to the present invention. With these embodiments, in order to internally secure the engaging cylindrical portion 48 of the cover 18a, a hardened layer 52 is formed on a portion of a cylindrical inside face 51 formed on the inner peripheral face of the opening portion on the axially inner end of the outer ring member 7. Methods of forming the hardened layer 52 may involve for example carburizing-quenching or nitriding. However high frequency quenching is preferable because it can ensure the required surface hardness at a low cost.

The cover 18a is made from a metal plate such as a cold-rolled steel plate of for example SPCC (JIS G 3141), or a stainless steel plate in an overall disk shape by a forming process, for example pressing or drawing.

The surface hardness of the cover 18a made from a cold-rolled steel or a stainless steel is less than that of the hardened layer 52 made by quenching the bearing steel. Accordingly, with repeated fitting and removal of the cover 18a to and from the opening portion on the axially inner end of the outer ring member 7, the hardened layer 52 is not damaged in spite of the repeated frictional rubbing between the cylindrical inside face 51 and the tip end rim and outer peripheral face of the engaging cylindrical portion 48 of the cover 18a. Consequently, even when the cover 18a is repeatedly fitted to and removed from the outer ring member 7 for replacement of the sensor 14a and the like, the engagement strength of the cylindrical inside face 51 and the outer peripheral face of the engaging cylindrical portion 48 formed on the cover 18a remains adequate, and any fitting clearance which could allow rain water and the like to enter between the mating faces is not formed.

Moreover, with the third and fourth embodiments, an O-ring 53 is fitted between the chamfered portion on the inner peripheral face of the axially inner end of the outer ring member 7, and the outer peripheral face of the base end of the engaging cylindrical portion 48 of the cover 18a (the respective right ends in FIGS. 4 and 5). The O-ring 53 is fitted so as to prevent the ingress of mud and water and the like into the interior region of the outer ring member 7 and the cover 18a. The fitting of the O-ring 53 between the chamfered portion of the axially inner end of the outer ring member 7 and the outer peripheral face of the engaging cylindrical portion 48 can be carried out simply and at low cost.

Instead of using the O-ring 53, one or both of the engaging faces of the inner peripheral face of the axially inner end of the outer ring member 7 and the outer peripheral face of the engaging cylindrical portion 48 may be painted with a coating liquid to form a water resistant film.

In the case of using the coating liquid for sealing, the sealing liquid may enter the interior of the bearing unit when exchanging the sensor. Since the sealing liquid is harmful to the rolling faces of the bearing, the case of using the O-ring is better, particularly so long as a mount space for the O-ring is available, because no sealing liquid enter the bearing using the O-ring.

Figure 6:
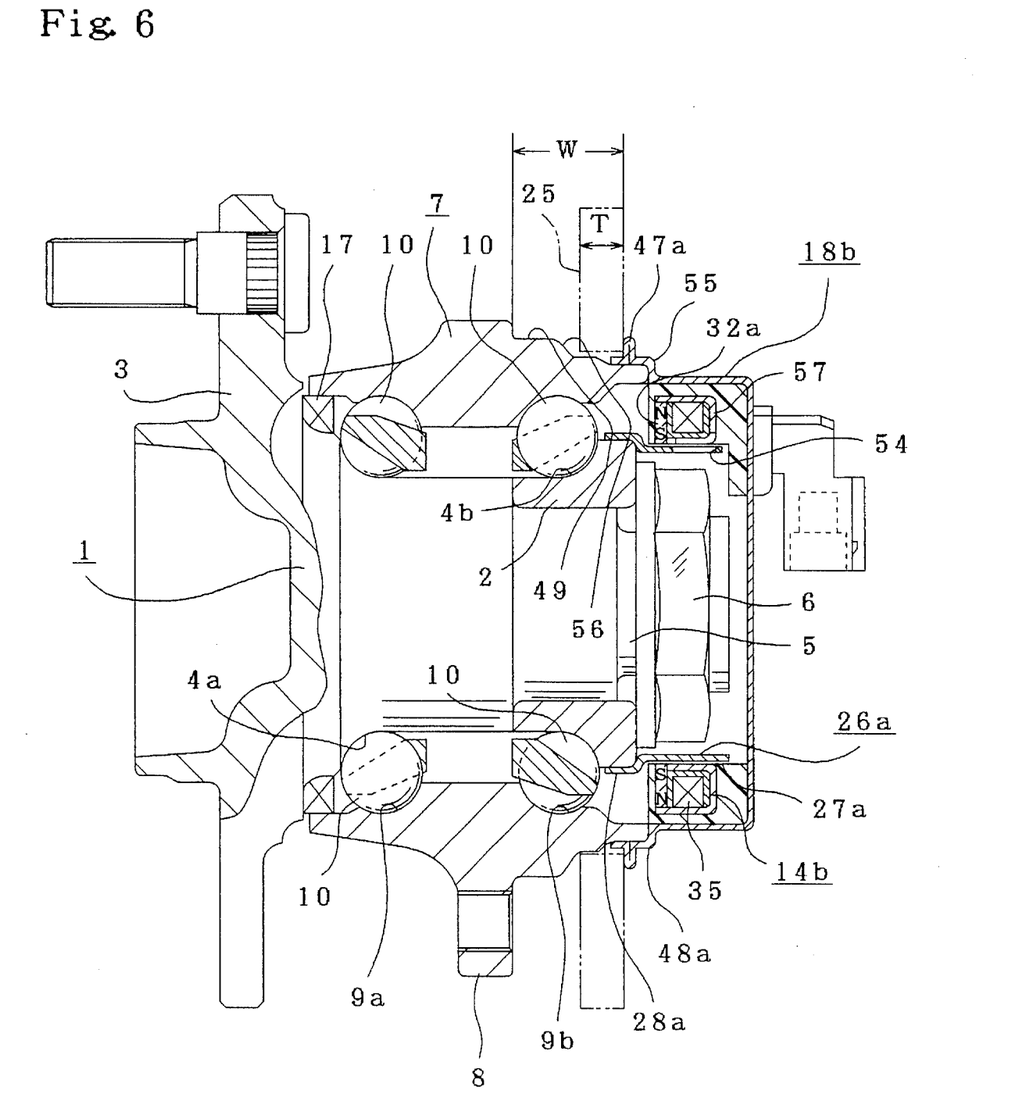
FIG. 6 is a cross-sectional view of part of a rolling bearing unit showing a fifth embodiment of the present invention.
Figure 7:
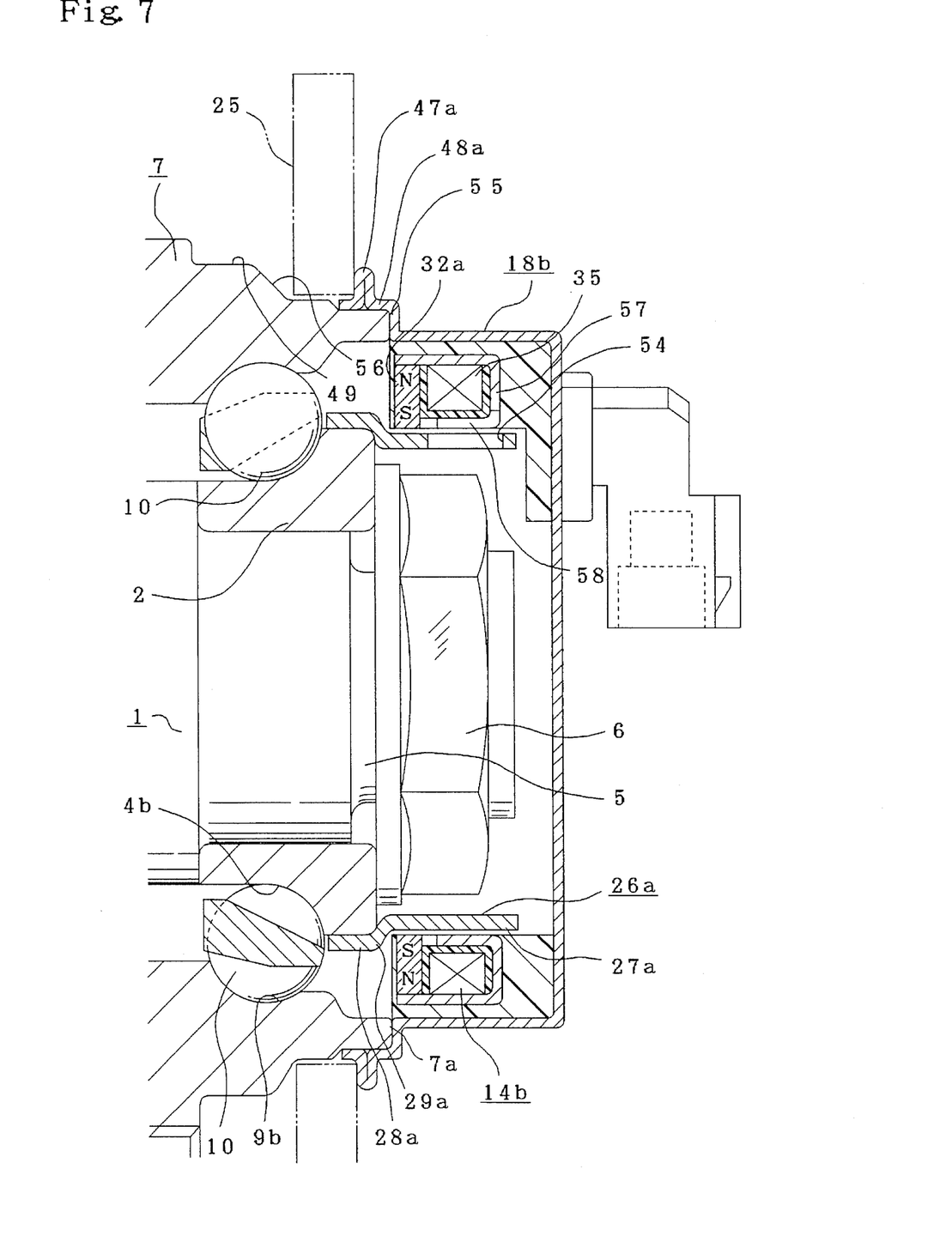
FIG. 7 is an enlarged view of the righthand part of FIG. 6.

FIGS. 6 and 7 show a fifth embodiment according to the present invention. With this embodiment, the tone wheel 26a comprises a larger diameter portion 28a for externally fixed to the axially inner end of the inner ring 2, a step portion 29a which is bent radially inwards from the axially inner end rim of the larger diameter portion 28a, and a smaller diameter portion 7a which continues axially inwards (to the right in FIGS. 6 and from the inner peripheral rim of the step portion 29a. The base end or larger diameter portion 28a of a tone wheel 26a (left end in FIG. 6 and 7) is externally secured to a portion on the axially inner end portion of the inner ring 2 spaced away from the inner ring raceway 4b. This tone wheel 26a is formed in an overall annular shape of crank shape in cross section, by press forming a magnetic metal plate.

A plurality of through-apertures 54 of a rectangular shape are formed in the smaller diameter portion 27a, at even spacing around the circumference. The tone wheel 26a is secured to the inner ring 2 with the larger diameter portion 28a externally engaged with the axially inner end portion of the inner ring 2, and the step portion 29a abutted against the outer peripheral rim of the axially inner end of the inner ring 2.

A cover 18b is externally secured to the opening portion on the axially inner end of the outer ring member 7. The cover 18b is formed in a bottomed cylindrical shape by drawing a metal plate such as a stainless steel plate.

A sensor 14b is fixedly supported inside the cover 18b so as to be faced to an outer peripheral face of a smaller diameter portion 27a of the tone wheel 26a across a small gap. The sensor 14b of this embodiment comprises a permanent magnet 32a magnetized in the radial direction, and a single stator 57. The stator 57 is provided with a plurality of cut-outs 58 at even spacing around the circumference.

A ring shaped step portion 55 is formed in the outer peripheral rim around the axially outer end opening (left end in FIGS. 6 and 7) of the cover 18b, inside of which the sensor 14b is supported. The step portion 55 is abutted against an axially inner end face 7a of the outer ring member 7. The outer peripheral rim of the step portion 55 is bent axially outwards through 90 degrees to thereby form an engaging cylindrical portion 48a.

The engaging cylindrical portion 48a of the cover 18b is externally secured to the axially inner end portion of the outer ring member 7. An outwardly flanged brim 47a referred to for example as a shotgun flange, is formed on the outer peripheral face of a central portion of the engaging cylindrical portion 48a, by expanding a portion of the metal plate of the cover 18b radially outwards while pressing axially to thereby produce an upset.

With the present embodiment, by engaging the inner peripheral rim of a split-type engaging portion of a tool 25 such as a hand press, or a pulley puller, with the brim 47a of the cover 18b, the cover 18b supporting the sensor 14b can be easily removed from the outer ring member 7. The height of the brim 47a formed by expanding a portion of the metal plate of the cover 18b radially outwards while pressing axially to thereby produce an upset, can be made sufficiently large and greater than twice the thickness of the metal plate. For example, when a stainless steel plate of a thickness around 0.8 mm is used for the metal plate, then a height greater than 5 mm, can be ensured without any problem. Accordingly, the overlap of the inner peripheral rim of the tool 25 and the brim 47a can be sufficiently ensured, so that the removal operation of the cover 18b can be reliably carried out without damage of the tool 25.

Moreover, since the brim 47a is formed at a location axially inwards (towards the right in FIGS. 6 and 7), than the axially outer end opening rim (left end rim in FIGS. 6 and 7) of the cover 18b, then the engagement strength (axial length of the engagement portion) of the engaging cylindrical portion 48a and the outer ring member 7 can be ensured, while maintaining a space W between the axially outer face of the brim 47a and the axially inner face of the attachment portion 8. Consequently, the thickness T of the engaging portion of the tool 25 which is inserted between the axially outer face of the brim 47a and the axially inner face of the attachment portion 8 can be large enough, so that the rigidity of the engagement portion of the tool 25 can be sufficiently ensured, enabling the cover 18b removal operation to be safely carried out.

Furthermore, with the embodiment shown in FIG. 6, a cylindrical face 49 is formed on an axially inner portion of the outer ring member 7 than the attachment portion 8, so that this cylindrical face 49 is inserted without any play, into the aperture of the support member (knuckle) provided on the suspension unit.

The cylindrical face 49 and the outer peripheral face on the axially inner end portion of the outer ring member 7 are connected by a step portion 56.

Also, with the embodiment in FIGS. 6 and 7, the outer diameter of the brim 47a is made equal to or less than the diameter of the cylindrical face 49, so that at the time of inserting the cylindrical face 49 into the aperture of the support member in order to fit the speed sensing rolling bearing unit to the suspension unit, the outer peripheral rim of the brim 47a does not interfere with the peripheral rim of the aperture.

In this respect, the tool 25 also can have an optional thickness for insertion between the step portion 56 and the axially outer face of the brim 47a. However depending on the construction of the suspension unit, for example when the aperture portion is formed in two half parts, then the outer peripheral rim of the brim 47a can be located radially further outwards than the cylindrical face 49.

The respective embodiments shown in the figures all illustrate embodiments of the present invention for speed sensing rolling bearing units for supporting a non-driven wheel (front wheel for a front engine-rear wheel drive vehicle, or rear wheel for a front engine-front wheel drive vehicle), and detecting the rotational speed of the non-driven wheel. However since the features of the present invention are for the engagement portions of the cover and the outer ring member, the invention is not limited to this type of unit for non-driven wheel, and is clearly also applicable to units for driven wheels (rear wheel of a front engine-rear wheel drive vehicle, front wheel of a front engine-front wheel drive vehicle, and either wheel of a four wheel drive vehicle) such as shown in FIG. 9.

With the speed sensing rolling bearing unit according to the present invention constructed and operated as described above, separation of the cover supporting the sensor, from the outer ring member can be easily carried out without damage to the cover. As a result, when one or other of the rolling bearing unit or the sensor is damaged, it is possible to reuse the undamaged component, enabling a reduction in repair costs, and the conservation of resources.

In particular, with the speed sensing rolling bearing unit of the present invention, the height of the brim of the cover is kept sufficiently high so that engagement of the tool and the brim can be adequately achieved, enabling easy and reliable removal of the cover without damage to the tool. Moreover depending on requirements, the operation of securing the speed sensing rolling bearing unit to the suspension unit can be easily carried out, and the support strength adequately ensured.

What is claimed is:

1. A rolling bearing unit with a rotational speed sensor comprising:

a stationary outer ring member having an end opening portion, an outwardly flanged attachment portion on an outer peripheral face thereof and an outer ring raceway on an inner peripheral face thereof, a rotatable inner ring member having an inner ring raceway and a flange for wheel fixture on an outer peripheral face thereof, a plurality of rolling bodies provided between the outer ring raceway and inner ring raceway, a tone wheel fixed to the inner ring member, a cover fixedly engaged with the end opening portion of the outer ring member, and a sensor supported in the cover so as to be faced to the tone wheel, the cover having an outwardly flanged brim formed on an outer peripheral face thereof, and the brim of the cover having at least a portion protruding radially outwards from the end opening portion of the outer ring member.

2. The rolling bearing unit of claim 1, wherein the cover has an end portion formed with an engaging cylindrical portion which is fixedly fitted into the end opening portion of the outer ring member, and the end opening portion of the outer ring member has an outer peripheral face and an end face such that a recess is formed in the outer peripheral face to open in the end face, and the portion of the cover protruding radially outwards from the and opening portion of the outer ring is faced to the recess.

3. The rolling bearing unit of claim 1, wherein the end opening portion of the outer ring member is formed with an engagement face, while the cover has an end portion formed with an engaging cylindrical portion which is fixedly fitted to the engagement face, and the engagement face is formed with a hardened layer.

4. The rolling bearing unit of claim 1, wherein an O-ring is supported between the cover and the outer ring member.

5. The rolling bearing unit of claim 1, wherein the cover has an end portion formed with an engaging cylindrical portion while the end opening portion of the outer ring member has an outer peripheral face formed with an engagement face which is fixedly fitted into the engaging cylindrical portion.

6. The rolling bearing unit claim 1, wherein the end opening portion of the outer ring member has an inner peripheral face formed with an engagement face while the cover has an end portion formed with an engaging cylindrical portion which is fixedly fitted into the engagement face.

7. The rolling unit claim 1, wherein the tone wheel has a smaller diameter portion, a larger diameter portion, and a step portion for connecting the smaller diameter portion to the larger diameter portion in a crank shape in cross section, the smaller diameter portion is fitted onto the inner ring member, and the larger diameter portion and the step portion jointly form a labyrinth seal provided close to the inner peripheral face of the outer ring member.

\* \* \* \* \*